United States Patent [19]

Steward et al.

[11] 3,929,991
[45] Dec. 30, 1975

[54] POLYCATIONIC INTERFERON INDUCES
[75] Inventors: David L. Steward, Carmel, Ind.; Wen-Hong Tong, Midland, Mich.
[73] Assignee: The Dow Chemical Company, Midland, Mich.
[22] Filed: July 26, 1973
[21] Appl. No.: 382,975

[52] U.S. Cl. ............................... 424/78; 424/85
[51] Int. Cl.$^2$ .................. A61K 39/00; A61K 45/04; A61K 31/785
[58] Field of Search ............................... 424/78, 85

[56] References Cited
OTHER PUBLICATIONS
Finter, *Interferons*, published by North–Holland Publishing Co., Amsterdam, 1966, pp. 182–192.

*Primary Examiner*—Shep K. Rose
*Attorney, Agent, or Firm*—Theodore Post; C. Kenneth Bjork

[57] ABSTRACT

A method which comprises administering to animals an antiviral amount of a polycationic adduct of a polyethylenimine, and a halopyridine polycationic adduct useful in practicing the method. Such method and adducts are useful in protecting the animals from the attack of various parasites and particularly from viruses, and to bring about the production of interferon or interferon-like materials.

4 Claims, No Drawings

POLYCATIONIC INTERFERON INDUCES

SUMMARY OF THE INVENTION

The method of the invention comprises the administration to an animal of an antiviral amount of a polycationic adduct. The adduct employed in the method of the invention is an adduct of a halopyridine with a polyethylenimine. More particularly, the adduct is the product of the reaction of a polyethylenimine having a molecular weight of from about 600 to about 60,000 with pentachloropyridine, the gram atomic ratio of polyethylenimine nitrogen to halopyridine nitrogen being from about 2:1, to about 4:1, to about 8:1.

The polycationic adducts of the invention can be employed in the form of the free bases or preferably in the form of pharmaceutically-acceptable salts thereof. The term "pharmaceutically-acceptable salt" as employed in the present specification refers to those salts of the free base with anionic moieties which are substantially non-toxic and non-irritating at dosages consistent with good antiviral or interferon-inducing activity. Representative pharmaceutically-acceptable salts which can be employed in the method of the invention include salts with one or more anions such as hydrochloride, hydrobromide, sulfate, nitrate, citrate, acetate, tartrate, malate, maleate, lactate, phosphate, toluenesulfonate, methanesulfonate, physiologically-active anions which produce no substantially deleterious or toxic effects at dosages consistent with good antiviral activity such as ascorbic acid, salicylates and the like and including amphoteric substances such as lysine, glycine, leucine and the like. Preferred pharmaceutically-acceptable salts of the polycations are prepared by conventional procedures such as the reaction of a polycation with a pharmaceutically-acceptable acid. Such reaction can be described as a neutralization reaction. Since the polycations have a plurality of amine moieties, they can be wholly or partly neutralized by formation of a pharmaceutically-acceptable salt involving one or more acids with part or all the amine moieties. Terms such as "neutralized" or "neutralized polycation" as employed herein refer to the pharmaceutically-acceptable salts of a polycation resulting from such neutralization.

In the present specification, the terms "polycation" and "polycationic adduct" are employed generically as inclusive of the free bases as well as the pharmaceutically-acceptable salts thereof. For the sake of convenience, when it is desired to refer specifically to the pharmaceutically-acceptable salt form of a polycation, terms such as "pharmaceutically-acceptable salt of a polycation" or "neutralized polycation" are employed.

The polycations are conveniently administered to animals by a parenteral route, that is, under or through one or more layers of skin or mucous membrane. In such preferred procedure, the parenteral administration of an effective amount of polycation to an animal is carried out by any suitable technique to accomplish the introduction of an effective amount of polycation into the animal body fluid systems such as the intracellular or extracellular fluid compartments, the lymphatic system or the blood circulatory system, for example. The polycation is preferably administered by injection via any of various routes such as intraperitoneal, subcutaneous, intramuscular, or the like.

In the naming of particular polycations herein, the molecular weight of the polyethylenimine moiety and the gram atomic ratio of polyethylenimine nitrogen to halopyridine nitrogen will be set out.

The molecular weight is conveniently expressed in a conventional fashion by a numeral following the expression "polyethylenimine" or the abbreviation "PEI", e.g., "PEI 6" refers to polyethylenimine having an average molecular weight of 600. The gram atomic ratio of PEI nitrogen to the halopyridine nitrogen reflects the proportions of PEI and halopyridine, and can be ascertained analytically for particular polycations from the molecular weight and elemental analysis.

The following additional description and examples further describe the invention and the manner and process of making and using it to enable the art skilled to make and use the same and set forth the best mode contemplated by the inventors of carrying out the invention.

DESCRIPTION OF THE PREFERRED EMBODIMENTS

The polycations employed in the methods and compositions of the invention advantageously are prepared by the condensation reaction of a polyethylenimine and pentachloropyridine. The reaction proceeds readily when the reactants are mixed together in an inert organic liquid reaction medium such as methanol, ethanol, ether, tetrahydrofuran, dioxane or the like, typically at the boiling point of the mixture. The exact polycation is dependent on a variety of factors such as the molecular weight of the PEI, the molar ratio of PEI (based on gram atomic proportions of PEI nitrogen) to pentachloropyridine, the reaction time and the temperature. The reaction proceeds when the mixture of polyethylenimine, reaction medium and pentachloropyridine is held at a temperature of from about 20° to about 110°C. for from about 30 minutes to 6 or more hours. Following the reaction, the reaction mixture containing the product can be evaporated or distilled to separate the polycation product as the hydrochloride salt formed with hydrogen chloride of reaction. The products can be employed directly in the treatment of animals, or they can be further separated, purified or treated by various conventional procedures such as dialysis, recrystallization, washing, electrodialysis, drying, neutralization, filtration, treatment with ion exchange resins, sterilization, fractionation by chromatographic techniques or by other techniques such as extraction or selective precipitation with organic solvents. It is generally desirable that the polycation product be treated to remove impurities prior to use.

The administration of an antiviral amount of one or more polycations to an animal is critical and essential to the practice of the method of the invention. The term "antiviral amount" is employed in the present specification and claims to designate that amount of a polycation which is sufficient to induce the production of interferon or an interferon-like substance in the body of an animal and, in general, interferon production or release, to inhibit viral attack and inhibit attack by various intra-cellular parasites which are susceptible to interferon, and can be accomplished by administration of the same antiviral amount. It is known that interferon is species specific, i.e., monkey interferon is not operable in sheep, etc. Whether an antiviral amount of a polycation is administered under particular circumstances can be ascertained by conventional testing procedures such as assay for interferon in the animal organism or by animal challenge procedures to determine inhibition of virus attack or parasite infection. The different testing procedures are known to vary in sensitivity depending upon such factors as assay procedure and materials employed; species, age and condition of animal challenged; severity and type of challenge; and the like. Therefore when it is desired to determine whether a particular small amount of a polycation is an antiviral amount, the more sensitive test procedures should be employed. It is generally convenient to employ test procedures which utilize a virus. Therefore, procedures utilizing viruses will be described herein as illustrative of the tests which can be employed to determine the antiviral amount of polycation to be employed in a particular case.

Assay of interferon can be carried out by procedures such as those described by Finter, "Interferons", pp. 87–118, in "Frontiers of Biology", Vol. 2, North-Holland Publishing Company, Amsterdam (1966). In an alternative procedure to determine whether an antiviral amount of a polycation has been administered, the animal is challenged with a dose of a suitable virus and held for observation to determine whether viral attack is inhibited as compared with untreated animals which are similarly challenged. Inhibition of viral attack can be indicated in a variety of ways including (1) protection of animals from physical symptoms of viral attack; (2) survival of a lethal virus challenge; (3) inhibition of reproduction of the challenge virus in the animal, as determined by an assay for the virus; or (4) failure of the animal to produce antibodies in response to the virus challenge as determined by immunological assay procedures.

The antiviral amount to be administered to an animal can vary depending upon such factors as the particular polycation employed, the size, weight, age and species of animal treated, the time and route of administration, whether the polycation is administered in a single dose or in multiple doses and the particular effects desired to be produced, that is, whether it is desired to provide only a desired concentration of interferon or interferon-like substances in the animal system, or whether it is desired to protect the animal against viral infection of light, moderate or severe degree over short periods of time or long periods of time. For example, an antiviral dose sufficient to protect the animal against a virus challenge at about 1 to 2 times the 50 percent infectious dose, $ID_{50}$, for that virus can be substantially less than the amount of polycation required to protect the same animal against a virus challenge 50 or 100 times as great. Similarly, the antiviral dose of a polycation sufficient to protect an animal against a relatively mild virus challenge may be insufficient to demonstrate the presence of interferon by conventional interferon assay techniques. In general, the polycations can be administered at dosage rates of from about 0.1 to 200 or more milligrams of polycation per kilogram of animal body weight. Preferably, the copolymers are administered by injection at dosages of from about 1 to about 25 milligrams of polycation per kilogram of animal body weight. Single or multiple doses of polycation can be administered at such dosage rates as have been found to give excellent antiviral results as ascertained by methods such as interferon assay techniques or by challenge procedures.

The polycations employed in the method of the invention can be formulated as compositions comprising an antiviral amount of one or more polycation in admixture with a pharmaceutically-acceptable adjuvant. Such compositions generally contain from about 0.0001 to about 10, to about 95 or more percent by weight of polycation. Concentrate compositions adapted for further dilution with pharmaceutically-acceptable adjuvants before use generally contain from about 10, to about 50, to about 95 percent by weight of polycation. The polycations are stable for prolonged periods, and both solid and liquid compositions retain their desirable antiviral properties during extended storage under a variety of storage conditions. The term "pharmaceutically-acceptable adjuvant" is herein employed to refer to those adjuvants conventionally employed in the administration of compounds to animals, which are substantially non-toxic at dosages of polycation composition, and which provide good antiviral effects so that the beneficial properties of the method and composition of the invention are not vitiated by effects attributable to the adjuvants. The procedures for selection of particular pharmaceutically-acceptable adjuvants to be employed in particular situations or for particular routes of administration are well known to those skilled in the formulation of compositions to be administered to animals.

The compositions can comprise aqueous vehicles including water-miscible vehicles and the parenteral preparations comprising a polycation and a basic substance will preferably include an aqueous vehicle. Representative aqueous vehicles include water, physiological saline, Ringer's injection, dextrose injection, lactated Ringer's injection, dextrose and alkali metal sulfites, sodium formaldehyde sulfoxylate or the like or chelating agents such as the sodium salt of ethylenediaminetetraacetic acid. They can also comprise finely divided inert solids, preferably water-soluble inert solids such as lactose, glucose, maltose, dextrose, gelatin and the like.

In a further embodiment of the invention, the copolymer compositions can contain effective amounts of other active agents either as adjuvants or as supplementary materials. Representative active agents employed in copolymer compositions can include chemotherapeutic agents, as well as biological agents including immune serum preparations, adjuvants such as Freund's adjuvant or alginic acid, anti-toxins, other interferon inducers such as Statolon; Tilorone or its derivatives; phytohemagglutinin; nucleic acids and derivatives thereof; and viruses which can be either live or inactivated, attenuated or unattenuated viruses.

In general, excellent results are obtained with parenteral compositions comprising an aqueous solution of an antiviral amount of a polycation and sufficient pharmaceutically-acceptable anion to provide a substantially neutral pH therein.

The following examples are illustrative of the invention but are not intended to limit the same.

EXAMPLE 1

The following representative procedure is employed to prepare a polycation adduct of PEI 6 having an atomic ratio of PEI nitrogen to pentachloropyridine nitrogen of 2:1.

4.3 Grams of polyethylenimine having a molecular weight of 600 (0.1 molar equivalent of PEI nitrogen) and 100 milliliters of methanol are mixed together in a glass vessel. To the resulting mixture is added 12.6 grams (0.05 mole) of pentachloropyridine in 200 milliliters of tetrahydrofuran. The mixture is heated at the boiling temperature under reflux for 2 hours. The mixture is then evaporated under reduced pressure to obtain the product as a solid, which is ground to obtain a yellowish powder.

EXAMPLE 2

The polycationic adduct of the preceding example is administered to separate groups of 14 or 15 mice of the same origin and past history. The compositions are administered by the intraperitoneal injection of 0.2 milliliter of said adduct as an aqueous solution of the hydrochloride salt to each mouse to provide a series of separate groups of mice treated with various amounts of polycation. Twenty-four hours after the administration of the polycation, the mice are challenged by the intraperitoneal injection of mengovirus (large plaque varient) at a rate sufficient to challenge each mouse with about 15 times the $LD_{50}$ of the mengovirus. (The term "$LD_{50}$" of a virus refers to a virus challenge sufficient to cause death in 50 percent of normal untreated mice.) A similar group of check mice which has been administered only water is similarly challenged with mengovirus, as are three similar groups which are administered the known Tilorone interferon inducer. All of the mice are then held and observed. The check mice are observed to exhibit symptoms of mengovirus infection, and all of the check mice are observed to die from mengovirus infection within about five days after the challenge. The survival rates for mice in the test groups treated by the injection of 10, 20, 40 and 80 milligrams of the polycation per kilogram of animal body weight eight days after challenge are 73, 71, 43 and 75 percent, respectively. The survival rates observed for mice administered Tilorone interferon inducer at rates of 25, 50 and 100 milligrams per kilogram are found to be 27, 53 and 93 percent, respectively.

EXAMPLE 3

Serum pools are obtained from mice and assayed by the following procedure. Aqueous compositions containing a polycationic adduct of PEI 12 with a molar ratio of PEI nitrogen to pentachloropyridine of 4:1 are prepared as the neutral hydrochloride salt. The compositions are administered to a group of mice by intraperitoneal injection of an antiviral amount of 100 milligrams of polycation per kilogram of animal body weight. Eighteen hours after administration of the polycation, the mice are exsanguinated and serum is pooled. The serum is then assayed to determine interferon titer by plaque reduction assay using mouse L929 cells with about 100 plaque-forming units of vesicular stomatitis virus (VSV) as a challenge. The assay procedure employed is similar to that described by Finter, "Interferons", in "Frontiers of Biology", Vol. 2, North-Holland Publishing Co. (1966) at pages 89–91. Substantial levels of interferon are detected; the serum pool is found to reduce plaque formation by about 50 percent at an 80-fold dilution. Serum incubated directly with VSV (1 hour and 37°C.) rather than with the cells, or assayed on heterologous cells (chick embryo, rabbit kidney) has a negligible effect on plaque formation. Incubation of the serum with trypsin for 90 minutes at 37°C. is found to destroy or dramatically reduce the inhibitory effect on VSV plaque formation. The supernatant liquid after centrifugation of the serum at 100,000 G. for one hour is found to exhibit antiviral properties comparable to that produced by the pooled serum. The above results indicate that the polycation induces the production of circulating interferon.

In check operations, serum pools are obtained from groups of similar adult mice and similar young mice which have not been administered a polycation, and the serum pools are similarly assayed for interferon. No significant interferon and no significant inhibition of VSV is found in the check serum pools.

EXAMPLE 4

A series of neutral sterile aqueous compositions is prepared containing from about 0.1 or less to 3 or more milligrams of a polycation per milliliter of composition, the polycation being present as the hydrochloride salt. Each composition is separately administered to a separate group of mice of the same origin and past history. The compositions are administered by intraperitoneal injection at various dosage rates. Eighteen hours after the administration of the polycation, the mice are challenged by the intraperitoneal injection of mengovirus (large plaque variant) at a rate sufficient to challenge each mouse with about 52 times the $LD_{50}$ of the mengovirus. All the mice are then held and observed for ten days. The mice are observed to determine the number of mice surviving the mengovirus challenge at a time when all the check mice (administered water only) are dead. The 50 percent protective dose, $PD_{50}$, (dosage sufficient to protect 50 percent of the mice) is calculated. The $PD_{50}$'s, $LD_{50}$'s and ratio of $LD_{50}$ to $PD_{50}$ for various polycations are set out in Table I.

Table I

| Poly-cation | Molecular Weight of PEI | Ratio PEI N/ to Cl$_4$ pyridyl N | $LD_{50}$ (mg/kg) | $PD_{50}$ (mg/kg) | $LD_{50}/PD_{50}$ |
|---|---|---|---|---|---|
| 1 | 60,000 | 2/1 | 200 | 20 | 10 |
| 2 | 1,200 | 2/1 | 200 | 5 | 40 |
| 3 | 600 | 2/1 | 100 | 8 to 20 | 12 to 5 |
| 4 | 1,800 | 3/1 | 336 | 4 | 84 |
| 5 | 60,000 | 4/1 | >400 | 6 | >66 |
| 6 | 60,000 | 4/1 | 200 | 7 | 29 |
| 7 | 20,000 to 40,000 | 4/1 | >400 | 5 | >80 |
| 8 | 20,000 to 40,000 | 4/1 | >400 | 43 | >10 |
| 9 | 1,800 | 4/1 | 296 | 3 | ≅100 |
| 10 | 1,800 | 4/1 | 303 | <2 | >152 |
| 11 | 1,200 | 4/1 | 200 | <2 | >100 |
| 12 | 1,200 | 4/1 | 200 | 6 | 33 |
| 13 | 1,800 | 8/1 | 95 | 2.5 | 38 |

EXAMPLE 5

In a challenge operation, separate groups of mice are administered various dosages of a polycation hydrochloride (PEI 18; PEI nitrogen to pentachloropyridine ratio 4:1) and challenged 18 hours later with Semliki forest virus by either subcutaneous injection of 40 $LD_{50}$ or virus or intraperitoneal injection of 300 $LD_{50}$ of virus. The virus challenges are sufficient to kill all the mice in untreated check groups within eight days. After 11 days, the intraperitoneal injection of 7.5 mg/kg of the polycation is found to protect 80 percent of the mice challenged intraperitoneally with a 300 $LD_{50}$ of virus challenge. About 50 percent of the mice are protected from subcutaneous challenge by 80 milligrams of test polycation when administered by either the subcutaneous or intraperitoneal routes.

EXAMPLE 6

Sera were obtained from African green monkeys and assayed by the following procedure. Aqueous compositions containing a polycationic adduct of PEI 18 with a molar ratio of PEI nitrogen to pentachloropyridine of 4:1 are prepared as the neutral hydrochloride salt. The compositions are administered to a group of African green monkeys by intraperitoneal injection of an antiviral amount of 25 mg. of polycation per kilogram of animal body weight administered as 4.25 ml. of aqueous solution containing 14.7 mg./ml. of polycation. Blood samples are collected 4 hours before and 20 hours after administration of the polycation. The blood samples are processed for sera and the sera tested for VSV plaque reduction on HR-201 cells and the interferon titer determined by the method of Finter. The interferon titer in the +20 hour blood sample is 140 units of interferon. The sera from blood samples collected before administration of polycation has an interferon titer of less than 5.

EXAMPLE 7

The polycation of Example 6 is administered to a group of mice by intraperitoneal injection to determine its activity against Friend leukemia virus (FLV) infection of mice. Separate groups of mice are administered polycation intraperitoneally at different times either before or after being challenged with FLV. At 14 days post virus challenge, the mice are sacrificed, weighed and splenectomized. The mice spleens are weighed and homogenized. Spleen homogenates are assayed for their contents of FLV by plaque assay or $S^+L^-$ cells; R. H. Bassin et al., Nature 229:564–566 (1971). Treatment of mice one day before challenge with FLV significantly reduces spleen enlargements (Table II) and spleen virus titers (Table III). Treatment at day 12 causes slight but not significant reduction of splenomegaly. All other treatment times either have no effect or enhance splenomegaly.

TABLE III

COMPARISON OF FRIEND VIRUS TITERS OF SPLEENS AT 14 DAYS

| Spleen Weight (mg) Rx:Saline −1 day + FLV | Rx:poly- cation −1 day + FLV | Focus Forming Units × 10⁻² Per Total Spleen Rx: Saline −1 day + FLV | Rx:poly- cation −1 day + FLV |
|---|---|---|---|
| 605 | 291 | 306.1 | 0 |
| 600 | 376 | 198.0 | 0 |
| 238 | 150 | 11.0 | 0 |
| 536 | 251 | 0 | 0 |
| 256 | 229 | 6.7 | 0 |
| 348 | 339 | 0 | 0 |
| 1598 | 250 | 856.5 | 7.5 |
| 678 | 267 | 1231.2 | 0 |
| 461 | 435 | 0 | 494.2 |
| 403 | 317 | 6.5 | 459.7 |
| 308 | 184 | 20.3 | 0 |
| 487 | 236 | 14.6 | 11.7 |
| 517 | 310 | 365.0 | 51.5 |
| 292 | 443 | 7.6 | 162.1 |
| 1223 | 93 | 36.7 | 1.9 |
| 193 | 257 | 0 | 0 |
| 261 | 171 | 0 | 0 |
| 1906 | 171 | 1010.2 | 0 |
| 1142 | 246 | 64.0 | 4.9 |
| 361 | 188 | 0 | 0 |
| Average 621 | 260 | 206.7 | 59.7 (72% reduction) |

What is claimed is:

1. A method which comprises parenterally administering to an animal about 18 to about 24 hours prior to viral infection an aqueous parenteral vehicle having a substantially neutral pH and containing an antiviral effective amount of polycation as a condensation polymer of pentachloropyridine with polyethylenimine having a molecular weight of from about 600 to about 60,000, wherein the gram atomic ratio of polyethylenimine nitrogen to pentachloropyridine nitrogen is from about 2:1 to about 8:1, wherein the condensation polymer is the product resulting from mixing together in the presence of an inert organic liquid reaction medium the said proportions of polyethylenimine and

TABLE II

COMPARISON OF SPLEEN WEIGHTS AT 14 DAYS OF MICE INJECTED I.P. WITH A SINGLE DOSE OF 30 MG/KG OF POLYCATION

| Day of Treatment[a] Relative to Infection | Log Dil'n of FLV[b] | Mice per Group | Spleen Weight (mg) Mean | Standard Deviation | % Size Reduction over FLV Control | Spleen Wt. (mg)/ Body wt. (g) Mean | Standard Deviation | % Size Reduction over FLV Control |
|---|---|---|---|---|---|---|---|---|
| − 1 day | 100.3 | 20 | 260[c] | 92 | 81 | 10.0[c] | 3.2 | 78 |
| − 6 hours | 100.3 | 20 | 709 | 450 | 20[d] | 28.9 | 16.6 | 32[d] |
| + 1 day | 100.3 | 18 | 857 | 572 | 53[d] | 32.6 | 23.2 | 54[d] |
| + 3 days | 100.3 | 20 | 992 | 761 | 83[d] | 37.3[c] | 27.6 | 81[d] |
| + 6 days | 100.3 | 17 | 583 | 521 | 9 | 21.1 | 16.3 | 13 |
| + 9 days | 100.3 | 18 | 663 | 679 | 9[d] | 27.7 | 27.7 | 25[d] |
| + 12 days | 100.3 | 20 | 544 | 416 | 17 | 21.5 | 16.6 | 11 |
| − 1 day | unchallenged | 10 | 170[c] | 49 | — | 6.7[c] | 1.9 | — |
| untreated | 100.3 | 20 | 621 | 475 | — | 23.4 | 18.2 | — |
| untreated | 101.3 | 10 | 295[c] | 113 | 73 | 11.7[c] | 4.1 | 68 |
| untreated | 102.3 | 10 | 209[c] | 92 | 92 | 7.9[c] | 3.1 | 91 |
| untreated | unchallenged | 11 | 174[c] | 33 | — | 6.3[c] | 1.1 | — |

[a] 30 mg/kg I.P. polycation in 0.85% solution, 0.2 ml/mouse
[b] 0.2 ml. I.P. of 20% spleen suspension in phosphate buffered saline
[c] Significantly different than FLV control mean at 95% confidence level (Duncan's Multiple Range Test)
[d] % increase over FLV control pentachloropyridine and wherein the polyethylenimine has a molecular weight of about 600 to about 60,000.

2. The method of claim 1 wherein the gram atomic ratio of polyethylenimine nitrogen to pentachloropyridine nitrogen is about 4:1.

3. The method of claim 1 wherein the gram atomic ratio of polyethylenimine nitrogen to pentachloropyridine nitrogen is about 8:1.

4. A composition comprising an aqueous parenteral vehicle having a substantially neutral pH and containing an antiviral effective amount of polycation as a condensation polymer of polyethylenimine with pentachloropyridine wherein the gram atomic ratio of polyethylenimine nitrogen to pentachloropyridine nitrogen is from about 2:1 to about 8:1, wherein the condensation polymer is the product resulting from mixing together in the presence of an inert organic liquid reaction medium the said proportions of polyethylenimine and pentachloropyridine and wherein the polyethylenimine has a molecular weight of about 600 to about 60,000.

* * * * *

UNITED STATES PATENT AND TRADEMARK OFFICE
CERTIFICATE OF CORRECTION

PATENT NO. : 3,929,991
DATED : December 30, 1975
INVENTOR(S) : David L. Steward; Wen-Hong Tong It is certified that error appears in the above-identified patent and that said Letters Patent are hereby corrected as shown below:

Column 6, line 59, the first "or" should read --of--;

Column 7, line 18 of Table II, following the first "untreated" in the first column, the rest of the line should read

-- 100.3  20  621  475  -  23.4  18.2  -  --;

Column 7, line 19 of Table II, delete "100.3".

Signed and Sealed this

Thirty-first Day of August 1976

[SEAL]

Attest:

RUTH C. MASON
Attesting Officer

C. MARSHALL DANN
Commissioner of Patents and Trademarks